M. MATTSON.
SYRINGE-TUBE FOR TREATMENT OF RECTAL DISEASES.
No. 171,677. Patented Jan. 4, 1876.
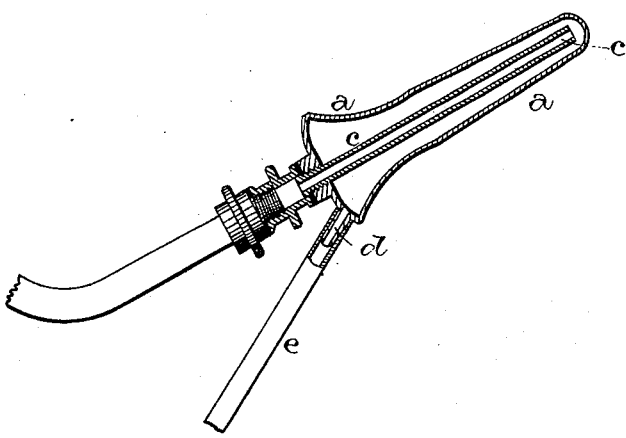
WITNESSES:
J. Wm. Garners
Frank M. Burnham.
INVENTOR:
Morris Mattson, M.D.
per
F. A. Lehmann, Atty.

UNITED STATES PATENT OFFICE.

MORRIS MATTSON, OF NEW YORK, N. Y.

IMPROVEMENT IN SYRINGE-TUBES FOR TREATMENT OF RECTAL DISEASES.

Specification forming part of Letters Patent No. 171,677, dated January 4, 1876; application filed December 18, 1874.

*To all whom it may concern:*

Be it known that I, MORRIS MATTSON, of New York city, in the county of New York and State of New York, have invented certain new and useful Improvements in Water-Bag Syringes; and I do hereby declare the following to be a full, clear, and exact description of the invention, such as will enable others skilled in the art to which it pertains to make and use it, reference being had to the accompanying drawings, which form part of this specification.

My invention relates to an improvement in cones for the treatment of rectal diseases; and it consists in inserting a tube into the cone, which is closed at its inner end, so that all of the water that is forced into the cone will escape from the tube at or against the inner end of the cone, and thus be made to flow its full length in escaping, thereby keeping all parts of the cone equally cold. Where the tube is not used the water at once escapes from the cone without circulating through it, and thus the cone is kept cool at its lower end only, while the upper end becomes warm from the heat of the body, and ceases to exert a healing influence.

The accompanying drawing represents my invention.

*a* represents a cone, made of suitable length, size, and material, and which is closed at its inner smaller end, and provided with an inlet and outlet for the water. Screwed into the larger end of the cone, through the inlet for the water, is a tube, *c*, which reaches up into the cone within a short space of the closed end, so that all the water that is forced into the cone will be thrown against its end. Being thus delivered at its inner end, the water is compelled to flow the whole length of the cone in order to escape through the outlet *d*, thus keeping every part of the cone equally cold at the same time that the friction of the water against the inside of the cone excites positive electricity, which, together with the dry cold application, gives relief to a person suffering from the piles such as can be gained in no other way. The outer end of the tube *c* is provided with a screw-thread, by means of which the cone can be attached to a siphonic syringe, water-bag, or elevated reservoir, so that after the flow of water has once been started it will be continuous and even, all of the waste water being conveyed away through a tube, *e*, to any vessel placed to receive it.

This cone may also be used for the cure of vaginal disease, but warm water will then be used instead of cold, so as to produce a dry heat.

Having thus described my invention, I claim—

The metal cone *a*, when furnished with an inner inlet tube extending to its farther end, and with a closed base and two openings for connecting the induction and eduction tubes, adapting it for use with any known syringe, all as and for the purpose described.

In testimony that I claim the foregoing I have hereunto set my hand this 17th day of December, 1874.

M. MATTSON.

Witnesses:
F. A. LEHMANN,
T. F. LEHMANN.